(12) United States Patent
Scott et al.

(10) Patent No.: US 6,377,750 B1
(45) Date of Patent: Apr. 23, 2002

(54) HEATING APPARATUS COMPRISING A PLASTICS BODY AND A PLANAR HEATING ELEMENT

(75) Inventors: Gerald R. F. Scott, Crowhurst; David V. Hefford, Esher, both of (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/685,544

(22) Filed: Oct. 10, 2000

Related U.S. Application Data

(62) Division of application No. 09/294,859, filed on Apr. 20, 1999, now Pat. No. 6,184,509.

(30) Foreign Application Priority Data

Apr. 24, 1998 (GB) .............................................. 9808634

(51) Int. Cl.$^7$ .............................. H05B 6/12; A47J 27/21
(52) U.S. Cl. ...................... 392/441; 219/617; 219/621; 126/348; 126/373; 392/459; 392/461
(58) Field of Search ................................ 219/617, 628, 219/629, 621; 126/344, 348, 373, 390, 392; 392/441, 443, 444, 451, 455, 458, 459, 461

(56) References Cited

U.S. PATENT DOCUMENTS

| | | | | |
|---|---|---|---|---|
| 3,606,102 A | * | 9/1971 | Lowry et al. | 222/570 |
| 4,422,442 A | | 12/1983 | Gutmann et al. | |
| 4,801,343 A | | 1/1989 | Tamba et al. | |
| 5,668,922 A | * | 9/1997 | Ross | 392/441 |
| 5,994,680 A | * | 11/1999 | McNair | 219/617 |

FOREIGN PATENT DOCUMENTS

| | | | |
|---|---|---|---|
| GB | 2291325 | | 1/1996 |
| JP | 1-184397 | * | 7/1989 |

\* cited by examiner

*Primary Examiner*—Philip H. Leung
(74) *Attorney, Agent, or Firm*—Ernestine C. Bartlett; Norman N. Spain

(57) ABSTRACT

A heating apparatus comprises a plastic body and a planar heating element, together defining a liquid heating vessel. The heating element is clamped between a portion of the body and a retaining ring, the body and the retaining ring being fixed together by an induction weld. Uniform compression of a seal is obtained during the welding process. The weld provides a reliable seal.

6 Claims, 2 Drawing Sheets

HEATING APPARATUS COMPRISING A PLASTICS BODY AND A PLANAR HEATING ELEMENT

CROSS REFERENCE TO RELATED APPLICATIONS

This is a divisional of application Ser. No. 09/294,859, filed Apr. 20, 1999 U.S. Pat. No. 6,184,509.

BACKGROUND OF THE INVENTION

This invention relates to heating apparatus comprising a plastics body and a planar heating element, and is particularly directed to the method of attaching the heating element to the body. The invention relates particularly, but not exclusively, to water heating apparatus such as electric kettles.

Various liquid heating appliances have been developed incorporating planar heating elements, and different techniques have been employed for the attachment of the heating element to the body of the heating apparatus. A seal is conventionally provided between the body of the heating apparatus and the heating element, and the attachment methods attempt to ensure a uniform compression of the seal in order to provide reliable sealing.

GB 2,291,325 discloses a method of attaching a planar heating element to a vessel body, which relies upon deformation of the vessel body around the heating element, so as to clamp the heating element in position while compressing a seal. One problem with this approach is that the deformation of the vessel body, which is achieved by heating the body and subsequently applying a force to the material, incurs structural weakness in the material. In the case of a plastics vessel body, subsequent creepage may occur reducing the compression held on the seal. Furthermore, the plastics deformation stage may not be controlled with sufficient accuracy to provide a known uniform level of compression of the seal.

SUMMARY OF THE INVENTION

According to the invention there is provided a method of attaching a planar heating element to a plastics body to define a liquid heating vessel, an aperture being defined in the body for receiving the heating element, the method comprising the steps of:

covering the aperture with one face of the heating element and positioning a seal between the heating element and the body;

positioning a retaining ring over the other face of the heating element, and which engages with a portion of the plastics body, an induction heating member being located between the body and the retaining ring;

causing inductive heating of the member to form an induction weld of the ring to the body, while applying a force to cause relative movement of the retaining ring and the vessel body to clamp the heating element in position and to compress the seal.

The invention also provides a heating apparatus comprising a plastics body and a planar heating element together defining a liquid heating vessel, the heating element being clamped between a portion of the body and a retaining ring, the body and the retaining ring being fixed together by an induction weld.

In the method and apparatus of the invention, the heating element is clamped between the plastics body and a retaining ring, and these two components are held together by an induction weld. The use of induction heating enables the retaining ring and the body to be moved relatively to each other as the plastic softens, so that compression of the seal may be obtained. After cooling of the induction weld, the compression is maintained on the seal. The induction weld is less susceptible to creepage than a plastic swaging operation, and also provides a more uniform compression of the seal than the use of a number of discrete securing members, such as screws.

Preferably the body defines a collar extending around and below the aperture, and the retaining ring has a channel which is fitted over the collar, the induction heating member being located between a portion of the collar and the portion of the channel. This arrangement facilitates the location of the retaining ring. The body may be provided with stops around an outside face of the collar, and the retaining ring is then caused to move during induction welding until a portion of the retaining ring abuts against the stops, thereby defining a predetermined compression of the seal. This arrangement avoids the need for accurate process control in order to obtain the desired seal compression for effectively sealing the element in the aperture.

An intermediate shielding element may be provided between the heating element and the retaining ring. For an effective induction welding joint, the material of the two components being joined should be the same. Consequently, it may be desirable to shield the retaining ring from the heat generated by the heating element, and the intermediate element is provided for this purpose.

The seal between the body and the element may be provided around the outer periphery of the heating element before the heating element is positioned over the aperture.

The induction heating member preferably comprises a continuous metal ring disposed in the channel, and the inductive heating is caused by generating a radio frequency alternating magnetic field in the vicinity of the heating member. The use of a continuous ring allows induced currents to flow around the heating member, and this reduces the required frequency for the induction welding process, simplifying and reducing the cost of the equipment needed. The frequency is approximately 50 KHz.

BRIEF DESCRIPTION OF THE DRAWINGS

The invention will now be described by way of example with reference to, and as shown in, the accompanying drawings in which.

DESCRIPTION OF THE PREFERRED EMBODIMENTS

Figure 1:
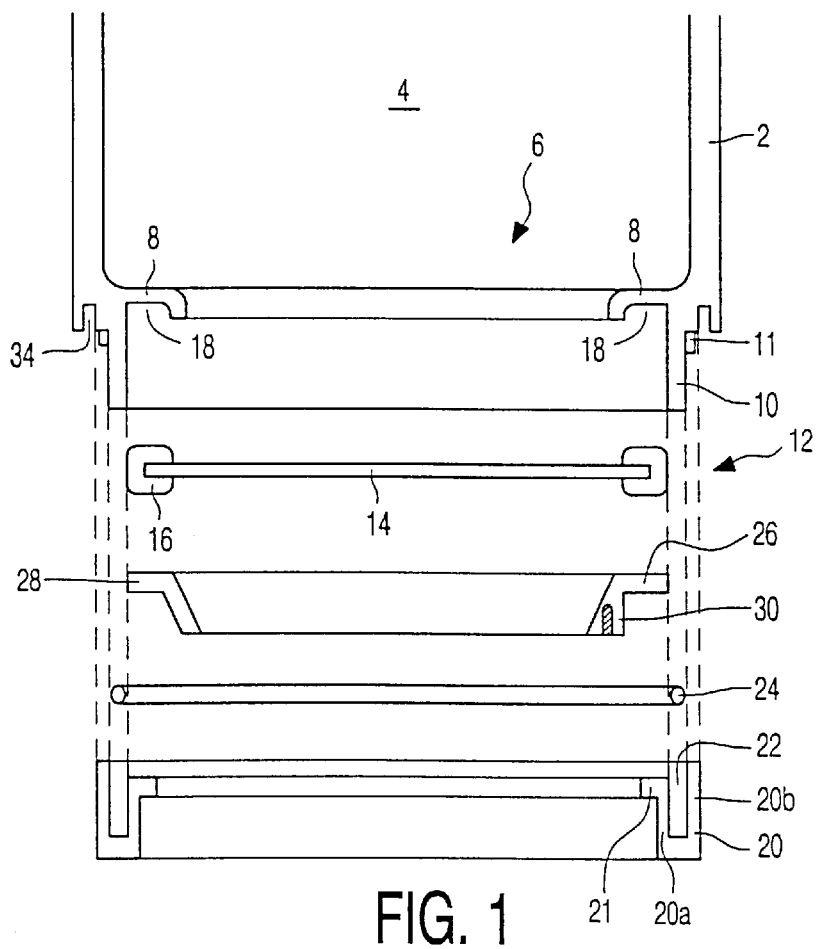
FIG. 1 shows an exploded view of the components required to assemble a heating element into a plastics body using the method of the invention.

FIG. 1 shows an exploded view of the components required to attach a planar heating element to a plastics body using the method of the invention. Essentially, a planar heating element is clamped between a portion of the body of the vessel and a retaining ring, and the clamping force is held by an induction weld joint between the retaining ring and the portion of the body.

In FIG. 1, the lower part of a plastics body 2 is shown. The body 2 comprises an outer wall which defines a chamber 4 for receiving liquid to be heated. An aperture 6 is defined near the base of the body 2, and the wall of the aperture 6 comprises a rib 8 which projects inwardly from the body 2. The body 2 comprises an annular collar 10 which extends below the rib 8, and the inner diameter of the collar 10 corresponds approximately to the outer diameter of a heating element assembly 12. In the example shown in FIG. 1, the assembly 12 comprises the heating element 14 and an annular seal 16 which is placed around the outer periphery of the element 14. Thus, in the embodiment of FIG. 1, the annular seal 16 has a C-shaped cross-section which defines a channel into which the outer periphery of the heating element 14 is received. The lower surface of the rib 8 has a recess 18 which contacts the upper surface of the seal 16 when the heating element assembly 12 is located in position.

The seal 16 may take a number of different forms, and the seal may instead be provided only on the face of the heating element 14 which closes the aperture 6.

The heating element 14 is secured in position by clamping between the rib 8 of the body 2 and an additional retaining ring 20 which engages with the collar 10 of the body 2. For this purpose, the retaining ring 20 has an annular channel 22 which cooperates with the collar 10, so that the retaining ring 20 may be slidably received over the collar 10. The retaining ring 20 is fixed to the body 2 by forming an induction weld between the collar 10 and the channel 22. For this purpose an induction heating member 24 is provided between the collar 10 and the channel 22. The induction welding operation will be described in further detail below.

In order to form an induction weld between the body 2 and the retaining ring 20, these two components should be made from the same plastics material, for example polypropylene or similar other plastics materials. These materials should be protected from the temperatures generated by the heating element during normal operation, so that direct contact between this material and the heating element should be avoided. The seal 16 provides a thermal barrier between the rib 8 of the plastics body 2 and the heating element 14, with a gap 9 being provided between the inner edge of the rib 8 and heating element 14.

To prevent direct contact between the heating element 14 and the retaining ring 20, an additional intermediate shielding element 26 is optionally provided between the retaining ring 20 and the heating element assembly 12. The shielding element 26 comprises a flange 28 which provides a barrier between the heating element 14 and the retaining ring 20, and preferably also includes a locating section 30, arranged as a mounting post having a threaded bore in the example of FIG. 1. This mounting post provides a securing point for a base 32 of the heating apparatus (shown in FIG. 2). The shielding element 26 may be made of a nylon based material or other thermally resistant material.

Figure 2:
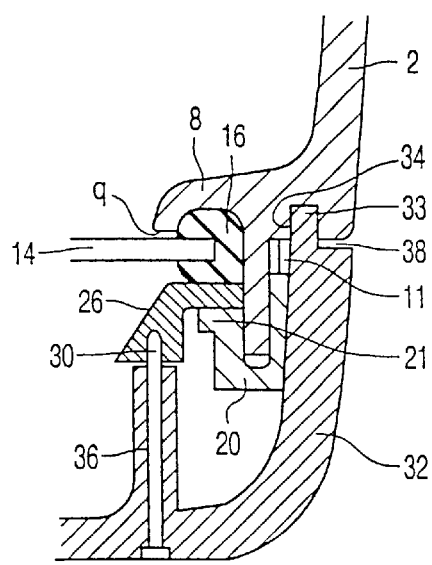
FIG. 2 shows, in cross section, the components of FIG. 1 in the assembled form.

The method of assembling the heating element into the plastics body will now be described with reference to FIG. 2, which shows the components of FIG. 1 after assembly using the method of the invention. FIG. 2 additionally shows the base 32 for the liquid heating vessel formed by the method of the invention.

To assemble the liquid heating vessel, the aperture 6 is covered by the heating element assembly 12 which is centered over the aperture by location inside the collar 10. The optional shielding element 26 is then placed on the opposite side of the heating element 14 to the rib 8. The retaining ring 20 is then engaged with the vessel body 2 by locating the channel 22 of the ring 20 over the collar 10. The retaining ring 20 can slide over the collar 10 into a position where it clamps the heating element 14 while compressing the seal 16. A predetermined compression of the seal 16, for example a minimum level of compression, is required to ensure an adequate seal of the heating element into the vessel. This compression is obtained by controlling the amount by which the retaining ring 20 slides over the collar 10. For this purpose, a series of stops 11 are provided around the outer surface of the collar 10. The retaining ring 20 comprises an internal and an external limb 20a, 20b (FIG. 1) and the top of the limb 20b abuts against the stops 11 in order to limit the sliding of the retaining ring 20 over the collar 10. The top of the internal limb 20a of the retaining ring 20 may be provided with an enlarged portion 21 which provides an increased surface through which pressure is applied to the heating element assembly 12.

In the method of the invention the induction heating member 24 is seated in the channel 22 of the retaining ring 20 before the retaining ring is positioned over the collar 10. When the retaining ring 20 is engaged over the collar 10, the dimensions of the components are such that the outer limb 20b of the retaining ring 20 does not initially reach the stops 11.

In order to perform the induction welding process, a radio frequency generator is required which supplies an oscillating electromagnetic field to a generator coil which is arranged to lie in close proximity to the induction heating member 24. This primary coil generates a radio frequency magnetic field which induces eddy currents into nearby metal components. These eddy currents give rise to Ohmic heat dissipation in those metal components. This heat dissipation increases the temperature of the heating member 24 thereby causing the plastic in the neighborhood of the member 24 to soften. During the induction welding process, a force is applied to the retaining ring to slide the ring 20 further over the collar 10 and thereby compress the seal 16. The retaining ring 20 is pushed over the collar 10 until the outer limb 20b of the retaining ring 20 abuts against the stops 11. At this point, there is a predetermined or minimum compression of the seal 16 which is desired for effective sealing of the heating element 14 into the plastics body 2. The force required to maintain this compression is held after the induction welding operation has been completed, and until the welded plastics components, in the vicinity of the heating member 24, have cooled and fused together.

The induction heating member 24 preferably comprises a continuous wire loop. The wire may for example comprise a stainless steel or nickel wire. The use of a continuous metal wire enables the induced eddy currents to flow in a loop. Uniform heat dissipation around the wire results, and the induced eddy currents enable a relatively low frequency RF generator to be employed, and at relatively low power. For example, the generator may operate at 40 KHz and may require a power dissipation of 2.5 KW. The induction welding cycle may typically last approximately 3 seconds.

An alternative to a continuous metal wire is the use of a plastics binder in which ferro-magnetic powder is impregnated. In this case, the alternating current in the primary coil gives rise to an alternating induced magnetic field in the ferro-magnetic powder particles. Hysteresis losses occur resulting from the oscillating field which give rise to heat dissipation. The use of ferro-magnetic particles embedded in a plastics carrier require a higher frequency RF generator to be employed (for example 4,000 KHz) and which may be required to operate at higher power (for example 5 KW).

FIG. 2 also shows a base 32 and which is secured using the threaded bore 30 in the mounting post of the shielding element 26. As shown, the base 32 has a connecting lug 33 which is received in a recess 34 of the body 2 to prevent lateral movement of the base 32. The base 32 is secured vertically using screws 36 which engage with the threaded bore 30. The junction between the base 32 and the body 2 may be designed to provide a styling line 38.

Figure 3:
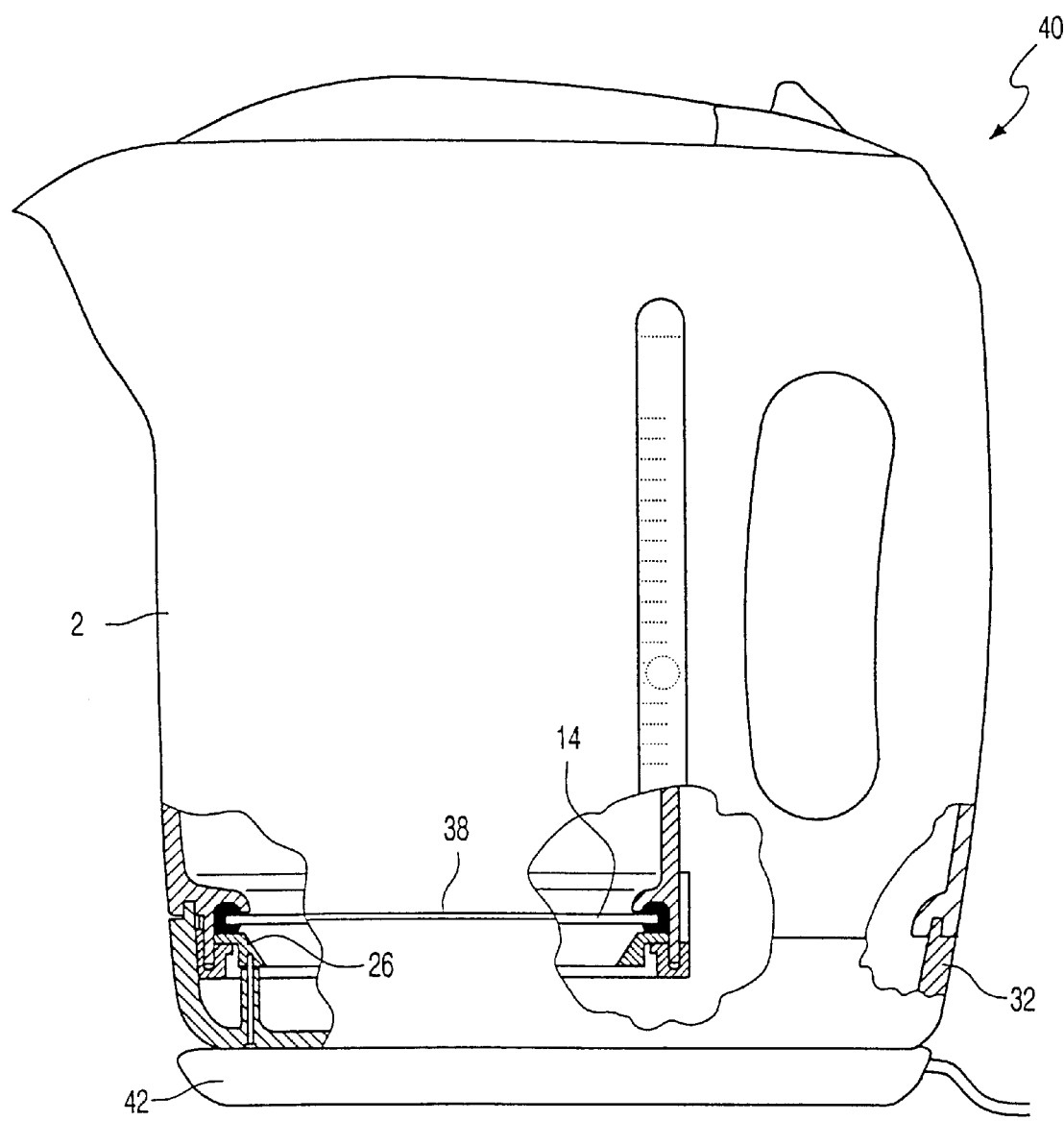
FIG. 3 shows a kettle according to the invention.

FIG. 3 shows an electric kettle 40 including a heating element 14 assembled using the method described with reference to FIGS. 1 and 2.

The kettle 14 includes the body 2 and the base 32 which are coupled together by engagement of the lug 33 with the recess 34 to provide the styling line 38. The base 32 is provided with a cordless connector which engages with an electrical base connector 42. In FIG. 3, exposed portions are provided to show the securement of the heating element and of the base to the body in accordance with the method of the invention. As shown in FIG. 3, a screw connection is provided for coupling the base 32 to the shielding element 26 at the front of the kettle (beneath the spout), whereas alternative forms of connection may be provided at the rear of the kettle (for example screw connections beneath the handle of the kettle 40).

The possible designs for the heating element itself will not be described, since any existing heating element may be attached to the vessel using the method of the invention, provided the heating element has a substantially planar rim portion which can be clamped in the manner required by the invention. Similarly, many different control circuits may be envisaged for use with the kettle shown in FIG. 3, but these will not be described since they will be apparent to those skilled in the art. Furthermore, although the attachment method described has been shown particularly with reference to a kettle, it will be appreciated that this attachment method may be employed in connection with numerous other liquid heating vessels, such as rice cookers, deep fat fryers, egg boilers and the like.

What is claimed is:

1. A heating apparatus comprising a plastics body and a planar heating element together defining a liquid heating vessel, the heating element being clamped between a portion of the body and a retaining ring, the body and the retaining ring being fixed together by an induction weld.

2. A heating apparatus as claimed in claim 1, wherein an aperture is defined in the body which receives the heating element, wherein the body comprises a collar which extends around and below the aperture, and wherein the retaining ring has a channel which is fitted over the collar, the induction weld being formed between a portion of the collar and a portion of the channel.

3. A heating apparatus as claimed in claim 2, wherein an annular heating member is located between the portion of the collar and the portion of the channel for forming the induction weld join.

4. A heating apparatus as claimed in claim 3, wherein the heating member comprises a continuous metal ring disposed in the channel.

5. A heating apparatus as claimed in claim 1, wherein a seal is located between the periphery of the heating element and the plastics body.

6. A heating apparatus as claimed in claim 1, comprising a kettle.

* * * * *